Figure 1:
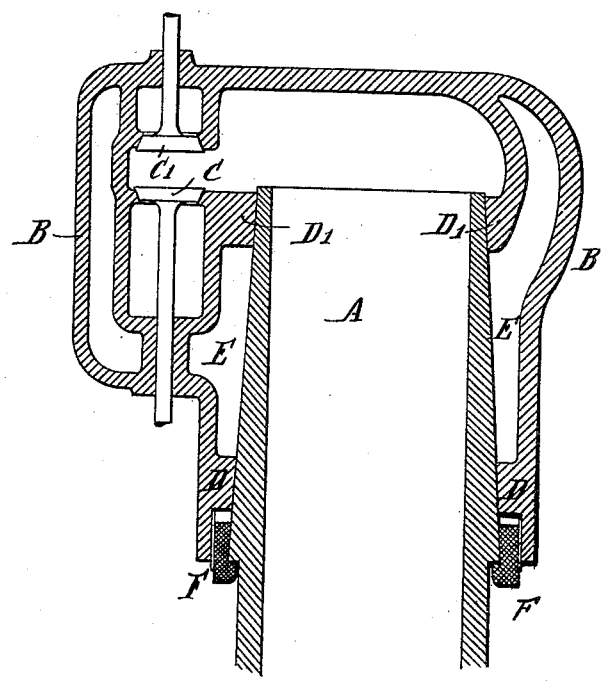

No. 676,891. Patented June 25, 1901.
E. HEIRMAN.
CYLINDER HEAD FOR MOTORS OPERATED BY HEATED GAS OR AIR.
(Application filed Aug. 18, 1900.)
(No Model.)
2 Sheets—Sheet 1.

WITNESSES:
Ella L. Giles
Otto Munk

INVENTOR
Edmond Heirman
BY
Richards
ATTORNEYS

THE NORRIS PETERS CO., PHOTO-LITHO., WASHINGTON, D. C.

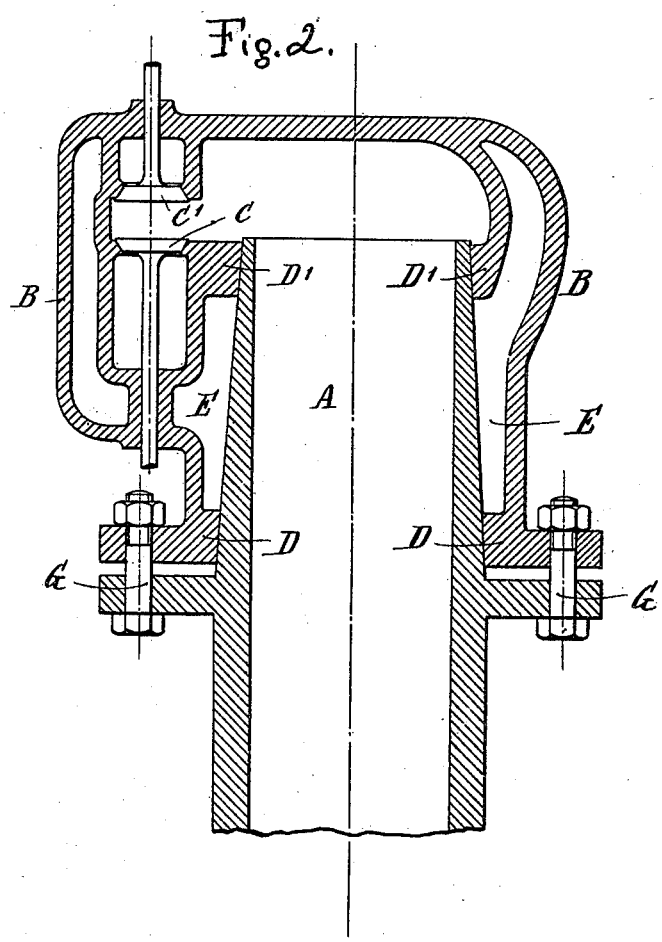

UNITED STATES PATENT OFFICE.

EDMOND HEIRMAN, OF MONT-SUR-MARCHIENNE, BELGIUM.

CYLINDER-HEAD FOR MOTORS OPERATED BY HEATED GAS OR AIR.

SPECIFICATION forming part of Letters Patent No. 676,891, dated June 25, 1901.

Application filed August 18, 1900. Serial No. 27,295. (No model.)

*To all whom it may concern:*

Be it known that I, EDMOND HEIRMAN, engineer, a subject of the King of Belgium, and a resident of Mont-sur-Marchienne, Belgium, have invented certain new and useful Improvements in Motors Operated by Heated Gases or Air, of which the following is a specification.

This invention has for its object a new arrangement for constructing the parts of cylinders of motors operated by heated gases or air, reference being made to the accompanying drawings by way of example.

In the drawings, Figure 1 shows a section of the apparatus with one form of securing means, and Fig. 2 a similar view with another form of securing means.

In the drawings the device is shown as comprising two parts, one, A, being the "cylinder," properly so-called, in which the piston reciprocates, the other, B, being the breech of this cylinder and contains two valves C C' or other distributing apparatus. The two parts A and B are connected by conical joints D D', so that in the intervening space E, as well as around the seatings of the valve, water can circulate for the purpose of keeping the engine cool. The two parts A and B are connected to one another by a ring-key (shown in section at F) or by bolts G, or in any other way. The advantages of this arrangement are, first, the making of the parts of the cylinders of motors operated by heated gases or air of pieces which are easily constructed, and, second, obtaining a tight joint between the explosion-chamber and the water-jacket, on the one hand, and between the water-jacket and the outside, on the other hand.

Having now particularly described and ascertained the nature of the said invention and in what manner the same is to be performed, I declare that what I claim is—

The combination with a cylinder having a tapering end, of a removable head or breech having valve-chambers therein, an inner wall forming a seat fitted to the extremity of the tapering end, and part of the valve-chambers, a combustion-chamber in communication with said valves and opening into the cylinder being formed between said inner wall and the rear outer wall, an extension of the outer wall having a seat fitted to the tapering end in advance of the first-mentioned seat, a water-space being formed between said inner and outer walls, said space being closed between the seats in the inner wall and the said extension by the cylinder whereby an annular chamber is formed about the same with extensions around the combustion and the valve chambers and means for retaining the breech in place.

In witness whereof I have hereunto set my hand in presence of two witnesses.

EDMOND HEIRMAN.

Witnesses:
  ED. CHIRIONET,
  GREGORY PHELAN.